United States Patent
Choi et al.

(10) Patent No.: US 12,165,279 B2
(45) Date of Patent: Dec. 10, 2024

(54) METHOD AND APPARATUS FOR INTERPOLATING FRAME BASED ON ARTIFICIAL INTELLIGENCE

(71) Applicant: SAMSUNG ELECTRONICS CO., LTD., Suwon-si (KR)

(72) Inventors: Narae Choi, Suwon-si (KR); Sungho Lee, Suwon-si (KR); Woongil Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 380 days.

(21) Appl. No.: 17/752,347

(22) Filed: May 24, 2022

(65) Prior Publication Data

US 2022/0375030 A1 Nov. 24, 2022

Related U.S. Application Data

(63) Continuation of application No. PCT/KR2022/007140, filed on May 18, 2022.

(30) Foreign Application Priority Data

| May 24, 2021 | (KR) | ............... 10-2021-0066498 |
| Aug. 17, 2021 | (KR) | ............... 10-2021-0108356 |
| Feb. 14, 2022 | (KR) | ............... 10-2022-0019101 |

(51) Int. Cl.
*G06T 3/4046* (2024.01)
*G06T 3/4007* (2024.01)
*G06T 7/246* (2017.01)

(52) U.S. Cl.
CPC .......... *G06T 3/4007* (2013.01); *G06T 3/4046* (2013.01); *G06T 7/246* (2017.01); *G06T 2207/20084* (2013.01)

(58) Field of Classification Search
CPC ..... G06T 3/4007; G06T 3/4046; G06T 7/246; G06T 2207/20084; G06T 3/00;
(Continued)

(56) References Cited

U.S. PATENT DOCUMENTS

| 7,098,959 B2 | 8/2006 | Mishima et al. |
| 10,467,768 B2 | 11/2019 | Xu et al. |

(Continued)

FOREIGN PATENT DOCUMENTS

| CN | 110351511 A | 10/2019 |
| CN | 110619655 A | 12/2019 |

(Continued)

OTHER PUBLICATIONS

Haoxian Zhang et al., "A Flexible Recurrent Residual Pyramid Network for Video Frame Interpolation", ECCV, 2020, 17 pages total.

(Continued)

*Primary Examiner* — Phuoc Tran
(74) *Attorney, Agent, or Firm* — Sughrue Mion, PLLC

(57) ABSTRACT

An artificial intelligence (AI)-based frame interpolation method includes obtaining, from among consecutive frames of an image, feature maps for a first frame at a plurality of levels and feature maps for a second frame at the plurality of levels, obtaining, via a flow estimation neural network, a first optical flow from a first feature map at a certain level to a second feature map at the certain level and a second optical flow from the second feature map at the certain level to the first feature map at the certain level, and obtaining a forward-warped first feature map by forward-warping the first feature map using the first optical flow and a forward-warped second feature map by forward-warping the second feature map using the second optical flow.

15 Claims, 9 Drawing Sheets

(58) Field of Classification Search
CPC .. G06T 3/40; G06T 7/20; G06T 7/593; G06T 15/50; G06N 3/08; H04N 5/14; H04N 7/01; H04N 19/132; H04N 19/137; H04N 19/172; H04N 19/53; H04N 19/80
See application file for complete search history.

(56) References Cited

U.S. PATENT DOCUMENTS

| | | | |
|---|---|---|---|
| 10,812,825 | B2 | 10/2020 | Liu et al. |
| 10,970,600 | B2 | 4/2021 | Huang et al. |
| 11,272,193 | B2 | 3/2022 | Lim et al. |
| 11,430,138 | B2* | 8/2022 | Chi .......................... G06N 3/08 |
| 11,800,053 | B2* | 10/2023 | Lu ........................... G06T 7/246 |
| 2012/0008689 | A1 | 1/2012 | Nasu et al. |
| 2023/0116893 | A1 | 4/2023 | Ren et al. |

FOREIGN PATENT DOCUMENTS

| | | |
|---|---|---|
| CN | 112785629 A | 5/2021 |
| KR | 10-2018-0119084 A1 | 11/2018 |
| KR | 10-2021-0011322 A | 2/2021 |
| WO | 2020/088766 A1 | 5/2020 |
| WO | 2020/150264 A1 | 7/2020 |
| WO | 2020/154537 A1 | 7/2020 |

OTHER PUBLICATIONS

Hyeonjun Sim et al., "XVFI: extreme Video Frame Interpolation", Computer Vision Foundation, ICCV, 2021, 10 pages total.

Jia Xu et al., "Accurate Optical Flow via Direct Cost Volume Processing", Computer Vision Foundation, CVPR, 2017, 9 pages total.

Deqing Sun et al., "PWC-Net: CNNs for Optical Flow Using Pyramid, Warping, and Cost Volume", Computer Vision Foundation, CVPR, 2018, 10 pages total.

Zachary Teed et al., "RAFT: Recurrent All-Pairs Field Transforms for Optical Flow", ECCV, 2020, 17 pages total.

Satoshi Iizuka et al., "Globally and Locally Consistent Image Completion", ACM Transactions on Graphics, vol. 36, No. 4, Article 107, DOI: http://dx.doi.org/10.1145/3072959.3073659, Jul. 2017, 14 pages total.

Jiahui Yu et al., "Generative Image Inpainting with Contextual Attention", Computer Vision Foundation, CVPR, 2018, 10 pages total.

Hyeongmin Lee et al., "AdaCoF: Adaptive Collaboration of Flows for Video Frame Interpolation", Computer Vision Foundation, CVPR, 2020, 10 pages total.

Wenbo Bao et al., "MEMC-Net: Motion Estimation and Motion Compensation Driven Neural Network for Video Interpolation and Enhancement", IEEE Transactions on Pattern Analysis and Machine Intelligence, arXiv:1810.08768v2, Sep. 2019, 16 pages total.

Junheum Park et al., "BMBC: Bilateral Motion Estimation with Bilateral Cost Volume for Video Interpolation", ECCV, 2020, 16 pages total.

Myungsub Choi et al., "Channel Attention Is All You Need for Video Frame Interpolation", The Thirty-Fourth AAAI Conference on Artificial Intelligence (AAAI-20), Association for the Advancement of Artificial Intelligence, 2020, 9 pages total.

Communication issued Apr. 18, 2024 by the European Patent Office in European Patent Application No. 22811565.5.

Lee, Sungho et al., "Enhanced Correlation Matching based Video Frame Interpolation", arxiv.org, Cornell University Library, Nov. 17, 2021, XP091100211. (9 pages total).

Zhang, Dacheng et al., "Flow-based frame interpolation networks combined with occlusion-aware mask estimation", IET Image Processing, 2020, vol. 14, Iss. 17, pp. 4579-4587, XP006110840. (9 pages total).

Sim et al., "XVFI: eXtreme Video Frame Interpolation," arXiv:2103.16206v1, Mar. 2021, Total 17 pages.

Niklaus et al., "Softmax Splatting for Video Frame Interpolation," arXiv:2003.05534v1, Mar. 2020, Total 11 pages.

Teed et al., "RAFT: Recurrent All-Pairs Field Transforms for Optical Flow," arXiv:2003.12039v1, Mar. 2020, Total 20 pages.

Communication dated Aug. 25, 2022, issued by the International Searching Authority in counterpart International Application No. PCT/KR2022/007140 (PCT/ISA/220, 210, 237).

* cited by examiner

METHOD AND APPARATUS FOR INTERPOLATING FRAME BASED ON ARTIFICIAL INTELLIGENCE

CROSS-REFERENCE TO RELATED APPLICATION(S)

This application is a bypass continuation of International Application No. PCT/KR2022/007140, filed on May 18, 2022, filed in the Korean Intellectual Property Office, which is based on and claims priority to Korean Patent Application No. 10-2022-0019101, filed on Feb. 14, 2022, in the Korean Intellectual Property Office, Korean Patent Application No. 10-2021-0108356, filed on Aug. 17, 2021, in the Korean Intellectual Property Office, and Korean Patent Application No. 10-2021-0066498, filed on May 24, 2021, in the Korean Intellectual Property Office, the disclosures of which are incorporated by reference herein in their entireties.

BACKGROUND

1. Field

The disclosure relates to a method and apparatus for interpolating an image frame. More particularly, the disclosure relates to a technique for interpolating an image frame by using artificial intelligence (AI).

2. Description of Related Art

With the advancement in artificial intelligence (AI)-related technology and the development and dissemination of hardware capable of reproducing and storing high-resolution/high-quality images, there has been an increasing need for a method and apparatus for effectively reconstructing a high-quality/high-resolution image from an image by using a neural network.

SUMMARY

Provided are method and apparatus for interpolating a frame of an image based on artificial intelligence (AI) are used to improve image reconstruction performance and an image quality by obtaining more accurate bidirectional optical flows between two frames based on a flow estimation neural network, obtaining, based on the bidirectional optical flows, an AI-based interpolation filter having a different filter coefficient for each pixel in a frame via an interpolation filter neural network, and interpolating a new frame between the two frames by using the AI-based interpolation filter.

Additional aspects will be set forth in part in the description which follows and, in part, will be apparent from the description, or may be learned by practice of the presented embodiments.

According to an aspect of the disclosure, an AI-based frame interpolation method may include obtaining, from among consecutive frames of an image, feature maps for a first frame at a plurality of levels and feature maps for a second frame at the plurality of levels, obtaining, via a flow estimation neural network, a first optical flow from a first feature map at a certain level to a second feature map at the certain level and a second optical flow from the second feature map at the certain level to the first feature map at the certain level, obtaining a forward-warped first feature map by forward-warping the first feature map using the first optical flow and a forward-warped second feature map by forward-warping the second feature map using the second optical flow, updating the first optical flow by using the forward-warped first feature map, updating the second optical flow by using the forward-warped second feature map, obtaining a first optical flow at a higher level that is higher than the certain level by upscaling the updated first optical flow to correspond to the higher level, obtaining a second optical flow at the higher level by upscaling the updated second optical flow to correspond to the higher level, determining, via an interpolation filter neural network, an AI-based frame interpolation filter for a third frame between the first frame and the second frame by using the obtained first optical flow at the higher level and the obtained second optical flow at the higher level, and obtaining the third frame by using the first frame, the second frame and the AI-based frame interpolation filter.

The higher level may be a highest level of the plurality of levels, and the highest level may be a level corresponding to the first frame and the second frame.

A first feature map of the first frame corresponding to a highest level of the plurality of levels, and a second feature map of the second frame corresponding to the highest level, may be obtained via a first neural network, first feature maps and second feature maps at lower levels that are lower than the highest level may be obtained via a downsampling neural network, and the feature maps for the first frame at the plurality of levels and the feature maps for the second frame at the plurality of levels may be respectively the first feature maps and the second feature maps at the lower levels.

The obtaining of the first optical flow and the second optical flow at the higher level may include obtaining a first importance weight at the certain level, where the first importance weight indicates a number of pixels in the first feature map at the certain level that are mapped to a pixel in the second feature map at the certain level, and obtaining a second importance weight at the certain level, where the second importance weight indicates a number of pixels in the second feature map at the certain level that are mapped to a pixel in the first feature map at the certain level.

The forward-warped first feature map may be obtained by further using the first importance weight at the certain level, and the forward-warped second feature map may be obtained by further using the second importance weight at the certain level.

A first importance weight at the higher level may be obtained based on the first optical flow at the higher level, and a second importance weight at the higher level may be obtained based on the second optical flow at the higher level.

The determining the AI-based frame interpolation filter for the third frame may include obtaining, based on the first optical flow at the higher level, the second optical flow at the higher level, the first importance weight at the higher level and the second importance weight at the higher level, a first intermediate optical flow from the third frame to the first frame and a second intermediate optical flow from the third frame to the second frame via an intermediate flow estimation neural network, obtaining forward-warped first frames and forward-warped second frames based on time t of the third frame and backward-warped first frames and backward-warped second frames based on the time t by using the first intermediate optical flow and the second intermediate optical flows, and determining, based on the forward-warped first frames, the forward-warped second frames, the backward-warped first frames and the backward-warped second frames, the AI-based frame interpolation filter for the third frame via the interpolation filter neural network.

The determining the AI-based frame interpolation filter for the third frame may include obtaining, based on the first optical flow at the higher level, the second optical flow at the higher level, the first importance weight at the higher level and the second importance weight at the higher level, a first intermediate optical flow from the third frame to the first frame and a second intermediate optical flow from the third frame to the second frame via an intermediate flow estimation neural network, obtaining forward-warped first frames and forward-warped second frames based on time t for the third frame by using the first intermediate optical flow and the second intermediate optical flow, determining, based on the forward-warped first frames, the forward-warped second frames, the backward-warped first frames and the backward-warped second frames, the AI-based frame interpolation filter for the third frame via the interpolation filter neural network.

The determining the AI-based frame interpolation filter for the third frame may include obtaining, based on the first optical flow at the higher level, the second optical flow at the higher level, the first importance weight at the higher level and the second importance weight at the higher level, a first intermediate optical flow from the third frame to the first frame and a second intermediate optical flow from the third frame to the second frame via an intermediate flow estimation neural network, obtaining forward-warped first frames and forward-warped second frames based on time t for the third frame by using the first intermediate optical flow and the second intermediate optical flow, determining, based on the forward-warped first frames and the forward-warped second frames, the AI-based frame interpolation filter for the third frame via the interpolation filter neural network.

The determining the AI-based frame interpolation filter for the third frame may include obtaining, based on the first optical flow at the higher level, the second optical flow at the higher level, the first importance weight at the higher level and the second importance weight at the higher level, a first intermediate optical flow from the third frame to the first frame and a second intermediate optical flow from the third frame to the second frame via an intermediate flow estimation neural network, obtaining backward-warped first frames and backward-warped second frames based on time t for the third frame by using the first intermediate optical flow and the second intermediate optical flow, and determining, based on the backward-warped first frames and the backward-warped second frames, the AI-based frame interpolation filter for the third frame via the interpolation filter neural network.

The first optical flow at the certain level may be updated based on a first correlation value between the forward-warped first feature map and the second feature map at the certain level, and the second optical flow at the certain level may be updated based on a second correlation value between the forward-warped second feature map and the first feature map at the certain level.

The first optical flow at the certain level may be updated based on candidate pixels within a predetermined range of the first optical flow at the certain level, and the second optical flow at the certain level may be updated based on candidate pixels within a predetermined range of the second optical flow at the certain level.

The predetermined range may vary according to a size of a feature map at the certain level.

Pixels used to calculate the first correlation value may be determined by a first filter set by a user from among the candidate pixels within the predetermined range, and pixels used to calculate the second correlation value may be determined by a second filter set by the user from among the candidate pixels within the predetermined range.

Pixels used to calculate the first correlation value may be determined by a first filter based on a trained neural network from among the candidate pixels within the predetermined range, and pixels used to calculate the second correlation value may be determined by a second filter based on a trained neural network from among the candidate pixels within the predetermined range.

A first highest correlation value among correlation values with pixels within a predetermined range of the second feature map at the certain level may be determined as a first correlation value, and a second highest correlation value among correlation values with pixels within a predetermined range of the first feature map at the certain level may be determined as a second correlation value.

The first optical flow and the second optical flow initially obtained at a lowest level among the plurality of levels may be set to 0.

The AI-based frame interpolation filter may include a filter kernel corresponding to each pixel in the first frame and the second frame.

Contextual feature maps of the first and second frames may be input to the interpolation filter neural network to determine the AI-based frame interpolation filter, and the contextual feature maps may be determined as a sum of an output value of a second neural network which receives the first frame and the second frame as an input value and an output value of a predetermined classification network which receives the first frame and the second frame as an input.

The AI-based frame interpolation filter may include a filter kernel for bilinear interpolation used for calculation of sub-pixels.

The AI-based frame interpolation filter may include a filter kernel based on at least one of a Z-map or a time of the third frame.

The AI-based frame interpolation filter may include a first frame interpolation filter and a second frame interpolation filter respectively applied to the first frame and the second frame.

When depth information of the first frame and depth information of the second frame exist, the depth information of the first frame and the depth information of the second frame may be additionally input to the interpolation filter neural network.

According to an aspect of the disclosure, an AI-based frame interpolation apparatus may include a memory and a processor configured to obtain, from among consecutive frames of an image, feature maps for a first frame at a plurality of levels and feature maps for a second frame at a plurality of levels, obtain, via a flow estimation neural network, a first optical flow from a first feature map at a certain level to a second feature map at the certain level and a second optical flow from the second feature map at the certain level to the first feature map at the certain level, obtain a forward-warped first feature map by forward-warping the first feature map using the first optical flow and a forward-warped second feature map by forward-warping the second feature map using the second optical flow, update the first optical flow by using the forward-warped first feature map, update the second optical flow by using the forward-warped second feature map, obtain a first optical flow at a higher level that is higher than the certain level by upscaling the updated first optical flow to correspond to the higher level, obtain a second optical flow at the higher level by upscaling the updated second optical flow to correspond to the higher level, determine, via an interpolation filter neural network, an AI-based frame interpolation filter for a third frame between the first frame and the second frame by using the obtained first optical flow at the higher level and the second optical flow at the higher level, and obtain the third frame by using the first frame, the second frame, and the AI-based frame interpolation filter.

A method and apparatus for interpolating an image frame based on AI are capable of improving the performance of image reconstruction by obtaining more accurate bidirectional optical flows between two frames based on a flow estimation neural network, obtaining, based on the bidirectional optical flows, an AI-based interpolation filter having a different filter coefficient for each pixel in a frame via an interpolation filter neural network, and interpolating a frame by using the AI-based interpolation filter.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
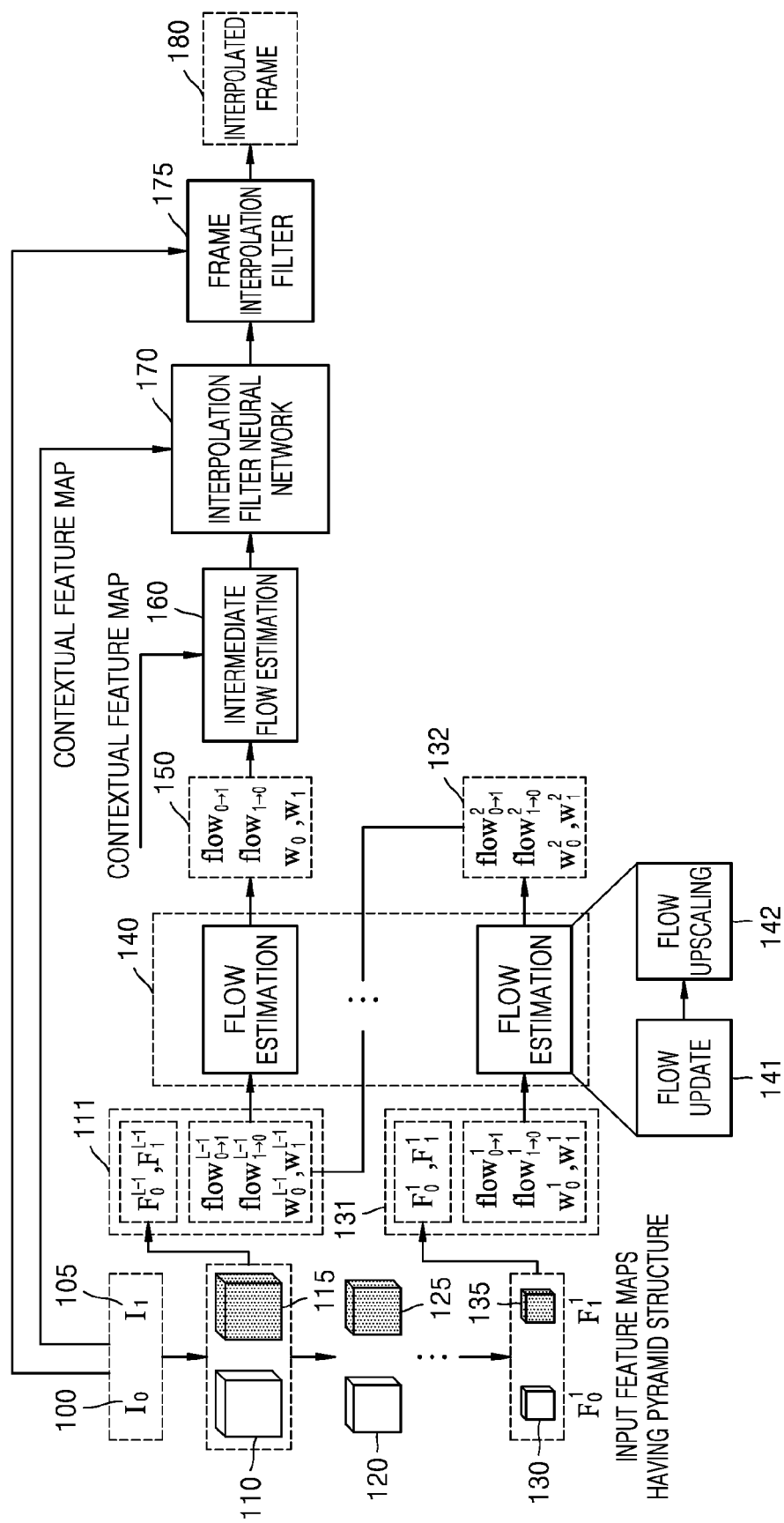
FIG. 1 is a diagram illustrating an example of a process of interpolating an image frame based on artificial intelligence (AI) according to an embodiment.

Throughout the disclosure, the expression "at least one of a, b or c" indicates only a, only b, only c, both a and b, both a and c, both b and c, all of a, b, and c, or variations thereof.

In the disclosure, because various changes may be made, and numerous embodiments of the disclosure may be provided, particular embodiments of the disclosure are illustrated in the drawings and will be described in detail in the detailed description. However, embodiments of the disclosure are not intended to be limited to the particular embodiments thereof, and it will be understood that all changes, equivalents, and substitutes that do not depart from the spirit and technical scope of numerous embodiments of the disclosure are encompassed in the disclosure.

In describing embodiments of the disclosure, when it is determined that detailed descriptions of related known technologies may unnecessarily obscure the essence of the disclosure, the descriptions thereof will be omitted. Furthermore, numbers (e.g., a first, a second, etc.) used in the description of the specification are merely identification symbols for distinguishing one element from another.

Furthermore, throughout the specification, it will be understood that when an element is referred to as being "connected" or "coupled" to another element, it may be directly connected or coupled to the other element, but may be connected or coupled to the other element with an intervening element arranged therebetween unless specified otherwise.

Furthermore, in the present specification, for an element expressed as a "unit", a "module", or the like, two or more elements may be combined into a single element, or a single element may be divided into two or more elements according to subdivided functions. Furthermore, each element to be described below may further perform, in addition to its main functions, some or all of functions performed by another element, and some of the main functions of each element may also be performed entirely by another element.

Furthermore, in the present specification, an 'image' or a 'picture' may refer to a still image, a moving image composed of a plurality of consecutive still images (or frames), or a video.

In addition, as used herein, a deep neural network (DNN) is a representative example of an artificial neural network model simulating brain nerves, and is not limited to an artificial neural network model using a particular algorithm. A neural network may also be referred to as a deep neural network.

Also, as used herein, a 'parameter' may refer to a value used in a computation process for each of layers constituting a neural network, and for example, may be used when an input value is applied to a certain operation equation. A parameter may refer to a value set as a result of training, and may be updated through separate training data when needed.

Also, in the present specification, a 'feature map' may refer to an image map output by inputting image data to a neural network. The feature map represents potential features of input data.

Furthermore, in this specification, an 'optical flow at a current level' may refer to an optical flow for a feature map at the current level, and an "optical flow at a higher level" means an optical flow for a feature map at a level higher than the current level.

In addition, in the present specification, a 'sample' may refer to data assigned to a sampling position in an image or a feature map for processing. For example, the sample may be a pixel value in a frame in the spatial domain.

FIG. 1 is a diagram illustrating an example of a process of interpolating a frame in an image based on artificial intelligence (AI) according to an embodiment.

Referring to FIG. 1, by inputting a first frame $I_0$ 100 and a second frame $I_1$ 105 among consecutive frames of an image to a first neural network for generating a feature map, a first feature map for the first frame $I_0$ 100 and a second feature map for the second frame $I_1$ are obtained. Furthermore, by inputting the first and second feature maps to a downsampling neural network, downsampled first feature maps 110, 120, and 130 at a plurality of levels and downsampled second feature maps 115, 125, and 135 at a plurality of levels are obtained.

The first neural network may be a general neural network used to extract features of an input image. For example, the first neural network may be a general convolutional neural network (CNN). However, embodiments of the disclosure are not limited thereto.

A downsampling neural network may be trained to obtain downsampled feature maps at a plurality of levels as an output by receiving one feature map as an input.

In addition, downsampled feature maps at a plurality of levels may be obtained using a downsampling neural network trained to perform downsampling at a certain ratio multiple times by receiving a feature map as an input.

An optical flow may be used to interpolate a new frame between consecutive frames. The optical flow may be defined as a position difference between samples in two consecutive frames, i.e., the first frame $I_0$ 100 and the second frame $I_1$ 105. In other words, the optical flow indicates the extent to which positions of samples in the first frame $I_0$ 100 are changed in the second frame $I_1$ 105 or where the samples in the second frame $I_1$ 105 are located in the first frame $I_0$ 100. For example, when a sample located at (x, y) in the first frame $I_0$ 100 is located at (x+f(x), y+f(y)) in the second frame $I_1$ 105, an optical flow for the sample may be derived as (f(x), f(y)).

Warping is a type of geometric transformation that is the shifting of positions of samples in an image. A forward-warped frame similar to the first frame $I_0$ 100 is obtained by warping the second frame $I_1$ 105 according to an optical flow indicating a relative position relationship between the samples in the first frame $I_0$ 100 and the samples in the second frame $I_1$ 105. For example, when a sample located at (1, 1) in the first frame $I_0$ 100 is most similar to a sample located at (2, 1) in the second frame $I_1$ 105, the position of the sample located at (1, 1) in the first frame $I_0$ 100 may be changed to (2, 1) through warping.

A flow estimation neural network 140 is a neural network trained to obtain a first optical flow $flow_{0\to1}$ from the first frame $I_0$ 100 to the second frame $I_1$ 105 and a second optical flow $flow_{1\to0}$ from the second frame $I_1$ 105 to the first frame $I_0$ 100 by using feature maps at a plurality of levels having a pyramid structure.

First, an initial value of a first optical flow $flow^1_{0\to1}$ at a lowest level that is an optical flow from the first feature map 130 at the lowest level of the first frame $I_0$ 100 to the second feature map 135 at the lowest level of the second frame $I_1$ 105 is set to 0, and an initial value of a second optical flow $flow^1_{1\to0}$ at the lowest level that is an optical flow from the second feature map 135 at the lowest level of the second frame $I_1$ 105 to the first feature map 130 at the lowest level of the first frame $I_0$ 100 is set to 0. Hereinafter, the lowest level is referred to as level 1. The first optical flow $flow^1_{0\to1}$ at level 1 from the first feature map 130 at level 1 to the second feature map 135 at level 1 is obtained and then used to perform forward warping on the first feature map 130 at level 1 and thereby obtain a forward-warped first feature map at level 1. The first optical flow $flow^1_{0\to1}$ at level 1 is updated (141) by calculating correlation values between the forward-warped first feature map at level 1 and the second feature map 135 at level 1 and then determining a position of a pixel having a highest correlation value. On the other hand, the second optical flow $flow^1_{1\to0}$ at level 1 from the second feature map 135 at level 1 to the first feature map 130 at level 1 is obtained and then used to perform forward warping on the second feature map 135 at level 1 and thereby obtain a forward-warped second feature map at level 1. The second optical flow $flow^1_{1\to0}$ at level 1 is updated (141) by calculating correlation values between the forward-warped second feature map at level 1 and the first feature map 130 at level 1 and then determining a position of a pixel having a highest correlation value.

In this case, because the initial values of the first and second optical flows $flow^1_{0\to1}$ and $flow^1_{1\to0}$ at level 1 are all set to 0, the forward-warped first and second feature maps at level 1 may be respectively the same as the first and second feature maps 130 and 135 at level 1. By comparing the first feature map 130 at level 1 with the second feature map 135 at level 1 and calculating correlation values therebetween, the first and second optical flows $flow^1_{0\to1}$ and $flow^1_{1\to0}$ at level 1 are each updated to a non-zero value.

Thereafter, by respectively upscaling the first and second optical flows $flow^1_{0\to1}$ and $flow^1_{1\to0}$ at level 1 to a size corresponding to level 2 that is immediately higher than level 1 that is the lowest level (142), first and second optical flows $flow^2_{0\to1}$ and $flow^2_{1\to0}$ at level 2 are obtained.

Calculating correlation values is, for example, to compare the forward-warped first feature map with the second feature map to determine whether they are similar to each other. This is because, when the optical flow is accurate, the forward-warped first feature map has to be the same as the second feature map. However, because a warped image may not be completely identical to a target image, an optical flow is updated by calculating a correlation value.

An optical flow and a warping method using the optical flow will be described below with reference to FIG. 2, and a method of calculating a correlation value using the optical flow and forward warping will be described below with reference to FIG. 3C.

Furthermore, first and second importance weights $w^1_0$ and $w^1_1$ at level 1 that is the lowest level may be obtained via the flow estimation neural network 140. The first importance weight $w^1_0$ at level 1 indicates how many pixels in the first feature map 130 at level 1 are mapped to a pixel in the second feature map 135 at level 1, and the second importance weight $w^1_1$ at level 1 indicates how many pixels in the second feature map 135 at level 1 are mapped to a pixel in the first feature map 130 at level 1. Initial values of the first and second importance weights $w^1_0$ and $w^1_1$ at level 1 are all set to 0.

After the first and second optical flows $flow^2_{0\to1}$ and $flow^2_{1\to0}$ at level 2 are obtained, first and second importance weights $w^2_0$ and $w^2_1$ at level 2 are respectively obtained based on the first and second optical flows $flow^2_{0\to1}$ and $flow^2_{1\to0}$ at level 2.

The first and second importance weights $w^2_0$ and $w^2_1$ at level 2 may be additionally used to obtain a forward-warped first feature map at level 2 and a forward-warped second feature map at level 2 for updating the first optical flow $flow^2_{0\to1}$ at level 2 and the second optical flow $flow^2_{1\to0}$ at level 2.

By repeatedly performing, in the same manner, a process at level 1 that is the lowest level using the obtained the first and second optical flows $flow^2_{0\to1}$ and $flow^2_{1\to0}$ at level 2 that is higher than the lowest level, the first and second optical flows $flow^2_{0\to1}$ and $flow^2_{1\to0}$ at level 2 are updated and upscaled to obtain a first optical flow $flow^3_{0\to1}$ at level 3 and a second optical flow $flow^3_{1\to0}$ at level 3 that is higher than level 2.

After the first and second optical flows $flow^3_{0\to1}$ and $flow^3_{1\to0}$ at level 3 are obtained, first and second importance weights $w^3_0$ and $w^3_1$ at level 3 are respectively obtained based on the first and second optical flows $flow^3_{0\to1}$ and $flow^3_{1\to0}$ at level 3.

The first and second importance weights $w^3_0$ and $w^3_1$ at level 3 may be additionally used to obtain forward-warped first and second feature maps at level 3 for updating the first and second optical flows $flow^3_{0 \to 1}$ and $flow^3_{1 \to 0}$ at level 3.

By repeating this process in the flow estimation neural network 140, when a level immediately lower than a highest level is denoted by level L-1, a first optical flow $flow^{L-1}_{0 \to 1}$ at level L-1 and a second optical flow $flow^{L-1}_{1 \to 0}$ at level L-1 are obtained (111), updated, and then upscaled to the highest level so that a first optical flow $flow_{0 \to 1}$ at the highest level, corresponding to the first frame $I_0$ 100, and a second optical flow $flow_{1 \to 0}$ at the highest level, corresponding to the second frame $I_1$ 105, are determined. Because the first optical flow $flow_{0 \to 1}$ for the first frame $I_0$ 100 and the second optical flow $flow_{1 \to 0}$ for the second frame $I_1$ 105 are finally obtained by updating and upscaling optical flows sequentially from the lowest level by using a plurality of feature maps, the flow estimation neural network 140 may share parameters in a neural network while sequentially updating and upscaling optical flows for the feature maps at a plurality of levels, thereby effectively increasing a receptive field without increasing the number of parameters in the neural network and accordingly obtaining more accurate optical flows. A receptive field refers to a size of an input region that produces a feature map.

In addition, a first final importance weight $w_0$ at the highest level, corresponding to the first frame $I_0$ 100, and a second final importance weight $w_1$ at the highest level, corresponding to the second frame $I_1$ 105 may also be obtained based on the first optical flow $flow_{0 \to 1}$ for the first frame $I_0$ 100 and the second optical flow $flow_{1 \to 0}$ for the second frame $I_1$ 105.

The flow estimation neural network 140 may be trained to minimize a loss between a frame of a feature map to be input and a frame warped using a final optical flow.

The obtained first optical flow for the first frame $I_0$ 100 and second optical flow for the second frame $I_1$ 105 correspond to bidirectional optical flows between the first and second frames $I_0$ 100 and $I_1$ 105. By using the bidirectional optical flows, each intermediate optical flow is estimated over time t for a third frame 180 between the first and second frames $I_0$ 100 and $I_1$ 105 via an intermediate optical flow estimation neural network 160. An intermediate optical flow may include a first intermediate optical flow $flow_{t \to 0}$ from the third frame 180 to the first frame $I_0$ 100 and a second intermediate optical flow $flow_{t \to 1}$ from the third frame 180 to the second frame $I_1$ 105 based on the time t between the first and second frames $I_0$ 100 and $I_1$ 105.

A first importance weight corresponding to the first frame $I_0$ 100 and a second importance weight corresponding to the second frame $I_1$ 105 may be additionally used in the intermediate optical flow estimation neural network 160.

An AI-based frame interpolation filter 175 for the third frame 180 between the first and second frames $I_0$ 100 and $I_1$ 105 is obtained via an interpolation filter neural network 170 trained based on the estimated intermediate optical flow.

In detail, forward-warped first and second frames and backward-warped first and second frames may be obtained using the first and second frames $I_0$ 100 and $I_1$ 105 and the first and second intermediate optical flows. Subsequently, the obtained forward-warped first and second frames and backward-warped first and second frames may be input to the interpolation filter neural network 170 to obtain the AI-based frame interpolation filter 175.

Furthermore, the first and second frames $I_0$ 100 and $I_1$ 105 may be additionally input to the interpolation filter neural network 170 and used to obtain the AI-based frame interpolation filter 175.

In addition, the first and second intermediate optical flows may be additionally input to the interpolation filter neural network 170 and used to obtain the AI-based frame interpolation filter 175.

In addition, the first and second frames $I_0$ 100 and $I_1$ 105 and the first and second intermediate optical flows may be additionally input to the interpolation filter neural network 170 and used to obtain the AI-based frame interpolation filter 175.

As another example, forward-warped first and second frames may be obtained using the first and second frames $I_0$ 100 and $I_1$ 105 and the first and second intermediate optical flows. Subsequently, the obtained forward-warped first and second frames may be input to the interpolation filter neural network 170 to obtain the AI-based frame interpolation filter 175.

Furthermore, the first and second frames $I_0$ 100 and $I_1$ 105 may be additionally input to the interpolation filter neural network 170 and then used to obtain the AI-based frame interpolation filter 175.

Furthermore, the first and second intermediate optical flows may be additionally input to the interpolation filter neural network 170 and then used to obtain the AI-based frame interpolation filter 175.

In addition, the first and second frames $I_0$ 100 and $I_1$ 105 and the first and second intermediate optical flows may be additionally input to the interpolation filter neural network 170 and then used to obtain the AI-based frame interpolation filter 175.

As another example, a backward-warped first frame and a backward-warped second frame may be obtained using the first and second frames $I_0$ 100 and $I_1$ 105 and the first and second intermediate optical flows. Subsequently, the obtained backward-warped first and second frames may be input to the interpolation filter neural network 170 to obtain the AI-based frame interpolation filter 175.

Furthermore, the first and second frames $I_0$ 100 and $I_1$ 105 may be additionally input to the interpolation filter neural network 170 and then used to obtain the AI-based frame interpolation filter 175.

Furthermore, the first and second intermediate optical flows may be additionally input to the interpolation filter neural network 170 and used to obtain the AI-based frame interpolation filter 175.

In addition, the first and second frames $I_0$ 100 and $I_1$ 105 and the first and second intermediate optical flows may be additionally input to the interpolation filter neural network 170 and then used to obtain the AI-based frame interpolation filter 175.

In addition, contextual feature maps respectively corresponding to the first and second frames $I_0$ 100 and $I_1$ 105 may be additionally input to obtain the AI-based frame interpolation filter 175.

The AI-based interpolation frame filter 175 has a different filter kernel for each pixel in each of the first and second frames $I_0$ 100 and $I_1$ 105.

In addition, a first intermediate optical flow reversal indicating a flow in an opposite direction to the first intermediate optical flow and a second intermediate optical flow reversal indicating a flow in the opposite direction to the second intermediate optical flow may be additionally input to the interpolation filter neural network 170 and then used to obtain the AI-based frame interpolation filter 175.

The third frame 180 between the first and second frames $I_0$ 100 and $I_1$ 105 is interpolated using the AI-based frame interpolation filter 175. Because the AI-based frame interpolation filter 175 has a filter kernel dynamically determined for each pixel, the third frame 180 may be interpolated more accurately.

This interpolation method may be applied to fields requiring data generation, such as light-field data synthesis, frame rate up-conversion, and three-dimensional (3D) rendering.

Figure 2:
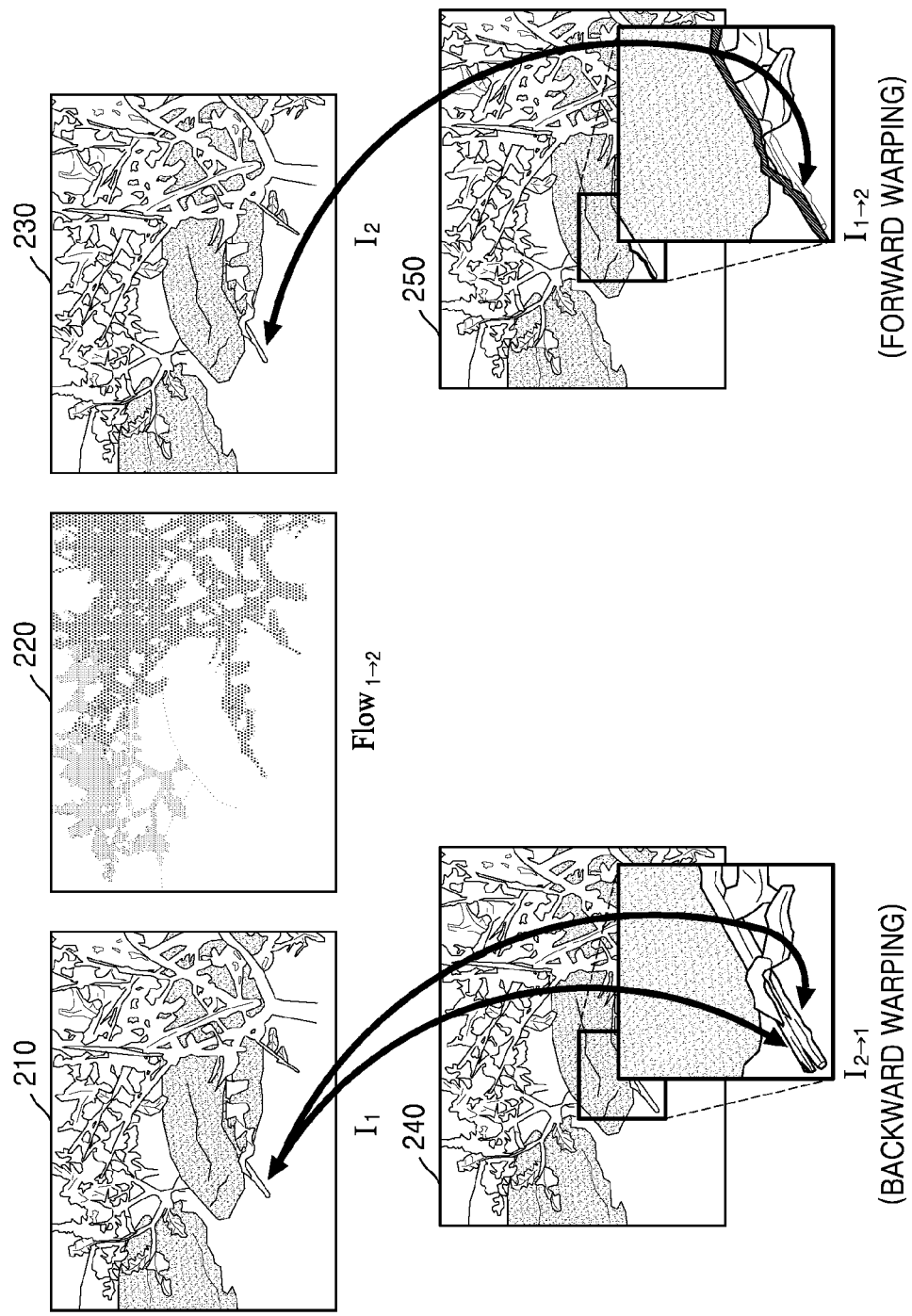
FIG. 2 is a diagram of an example of backward warping and forward warping based on an optical flow between frames according to an embodiment.

FIG. 2 is a diagram of an example of backward warping and forward warping based on an optical flow between frames according to an embodiment.

Referring to FIG. 2, a first or second frame 210 or 230 is warped based on an optical flow 220 from the first frame 210 to the second frame 230. Such warping is called forward warping or backward warping depending on a direction in which the warping is performed. In detail, warping the second frame 230 to the first frame 210 in a direction opposite to a direction of the optical flow 220 is called backward warping, and warping the first frame 210 to the second frame 230 in a direction corresponding to the direction of the optical flow 220 is called forward warping.

Occlusion regions may duplicately appear in the backward-warped image 240 as a result of warping, whereas hole regions where pixel values for occlusion regions are 0 may appear in the forward-warped image 260 as a result of warping. In backward warping, it is difficult to correct a flow by calculating a correlation value because occlusion regions duplicately appear. However, forward warping is suitable for correcting a flow by calculating a correlation value because a mapping region is one region due to hole regions.

Figure 3A:
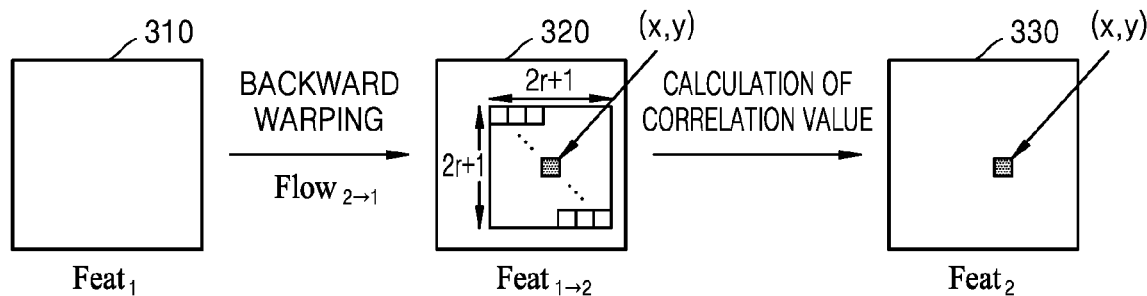
FIG. 3A is a diagram of an example of a method of calculating a correlation value by using a backward-warped feature map according to an embodiment.
Figure 3B:
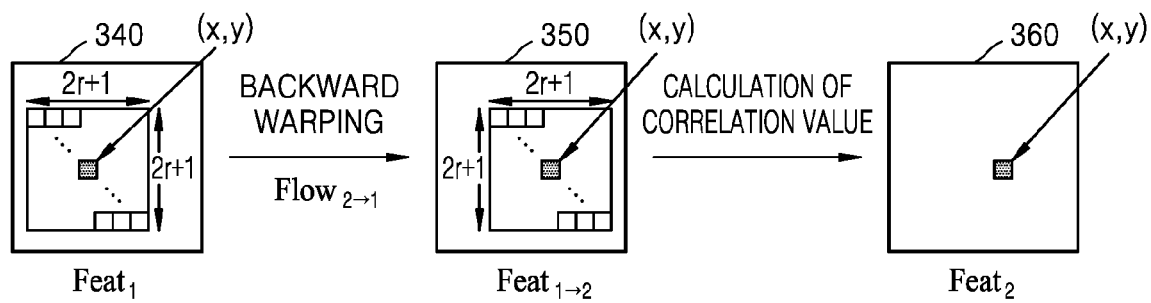
FIG. 3B is a diagram of a method of calculating a correlation value by using a backward-warped feature map according to an embodiment.

FIG. 3A is a diagram of an example of a method of calculating a correlation value by using a backward-warped feature map according to an embodiment. FIG. 3B is a diagram of a method of calculating a correlation value by using a backward-warped feature map according to an embodiment. FIG. 3C is a diagram of an example of a method of calculating a correlation value by using a forward-warped feature map according to an embodiment.

Referring to FIG. 3A, a first backward-warped feature map 320 is obtained by backward-warping a first feature map 310, and correlation values are calculated between the first backward-warped feature map 320 and a second feature map 330. Correlation values are calculated between pixels within a range corresponding to $(2r+1) \times (2r+1)$ around a pixel (x,y) in the first backward-warped feature map 320 and pixels in the second feature map 330 to find a pixel with a highest correlation value.

When correlation values are calculated using all pixels in the first backward-warped feature map 320, computational complexity increases as the square of spatial complexity as a resolution increases, and thus, correlation values are calculated using a particular range of pixels.

Referring to FIG. 3B, a first backward-warped feature map 350 is obtained by backward-warping a first feature map 340 within a range corresponding to $(2r+1) \times (2r+1)$ around a pixel (x,y) in the first feature map 340, and correlation values are calculated between the backward-warped first feature map 350 and a second feature map 360. Correlation values are calculated between pixels within a range corresponding to $(2r+1) \times (2r+1)$ around the pixel (x,y) in the backward-warped first feature map 350 and pixels in the second feature map 360 to find a pixel with a highest correlation value.

Here, r may vary according to a pyramid level or a size of a corresponding feature map. Furthermore, r may vary according to the performance or number of hardware (e.g., memory, etc.) in a frame interpolation apparatus.

Because the methods of FIGS. 3A and 3B use a backward-warped feature map to calculate correlation values, as described above with reference to FIG. 2, an afterimage (blur) may occur due to duplicated occlusion regions after backward warping, which may cause confusion in calculation of correlation values for correcting a flow.

Figure 3C:
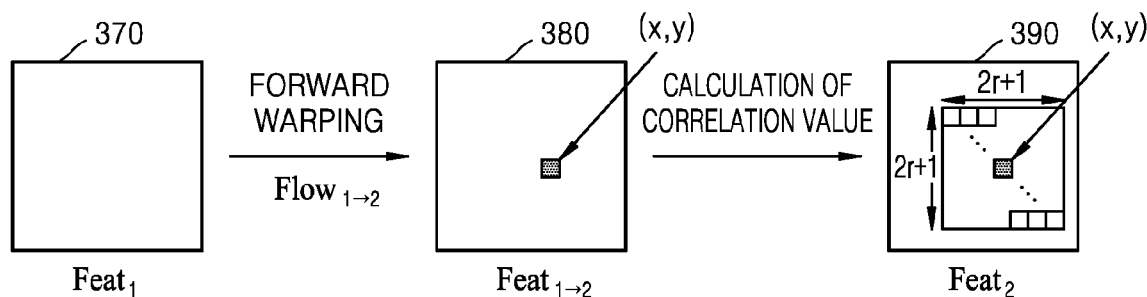
FIG. 3C is a diagram of an example of a method of calculating a correlation value by using a forward-warped feature map according to an embodiment.

Referring to FIG. 3C, a first forward-warped feature map 380 is obtained by forward-warping a first feature map 370, and correlation values are calculated between the first forward-warped feature map 380 and a second feature map 390. Correlation values are calculated between pixels in the first forward-warped feature map 380 and pixels within a range corresponding to $(2r+1) \times (2r+1)$ around a pixel (x,y) in the second feature map 390 to find a pixel with a highest correlation value.

Because the method of FIG. 3C uses a forward-warped feature map to calculate correlation values, the method may be easily applied for correcting a flow because occlusion regions do not occur as in the case of backward warping. In detail, by excluding an occlusion region from candidate flows, a possibility that duplicated candidate flows occur is reduced. Accordingly, the accuracy of candidate flows is increased.

Furthermore, when correlation values are calculated using pixels within the range corresponding to $(2r+1) \times (2r+1)$ in a warped feature map as described with reference to FIGS. 3A and 3B, blurred results are likely to be obtained due to blending with neighboring pixels that inevitably occurs during warping. To prevent this, as described with reference to FIG. 3C, correlation values for pixels within the range corresponding to $(2r+1) \times (2r+1)$ from the pixel (x,y) in the second feature map 390 are calculated.

A correlation value for updating a flow in the flow estimation neural network 140 of FIG. 1 is calculated according to the method of FIG. 3C. A method of calculating a correlation value and updating a flow will be described below with reference to FIG. 5.

Figure 4:
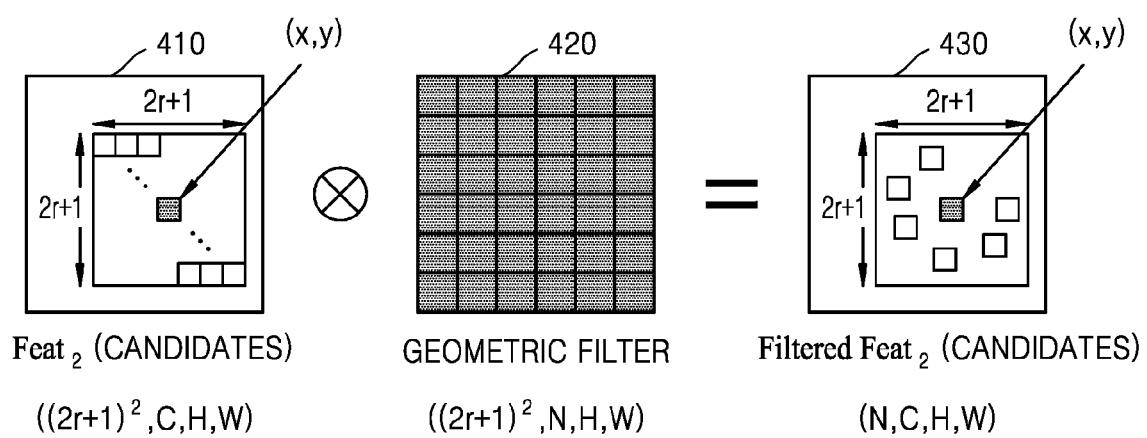
FIG. 4 is a diagram of an example of a filter used for selecting candidate pixels to be used when calculating a correlation value according to an embodiment.

FIG. 4 is a diagram of an example of a filter used for selecting candidate pixels to be used when calculating a correlation value according to an embodiment.

Referring to FIG. 4, pixels in a second feature map 410 to be used when calculating a correlation value may be pixels within a range corresponding to $(2r+1) \times (2r+1)$ around one pixel. The number of calculations may be reduced by calculating, via a geometric filter 420, correlation values using only some pixels even within the range corresponding to $(2r+1) \times (2r+1)$ rather than using all candidate pixels. Correlation values between a filtered second feature map 430 and a forward-warped first feature map may be calculated.

In detail, even when correlation values are calculated within the range corresponding to $(2r+1) \times (2r+1)$, when the value of $(2r+1) \times (2r+1)$ increases, a flow may be accurately found but a spatial complexity increases, and as the number of unnecessary samples increases due to a large range of a comparison region, training a neural network becomes difficult and thus flow estimation performance of the neural network may deteriorate. On the other hand, when the value of $(2r+1) \times (2r+1)$ decreases, a value of a flow may be a local minimum or may be erroneously estimated.

To solve these problems, a neural network-based filter may be used to properly refine a candidate group within a large comparison region. In other words, when the geometric filter 420 capable of extracting n candidates even within the range of $(2r+1) \times (2r+1)$ is used, an optimal flow may be corrected with low spatial complexity.

Accordingly, referring to FIG. 4, by selecting N pixels within a range of $(2r+1)^2$ of the geometric filter 420, corresponding to the range of $(2r+1)^2$ in the second feature map 410, correlation values are calculated using only N pixels in the range of $(2r+1)^2$ in the filtered second feature map 430. Here, H, W, and C respectively denote a height, a width, and a channel of a feature map.

The geometric filter 420 may be preset by a user or obtained via a trained neural network.

Furthermore, the geometric filter 420 may be determined to select only some of the pixels within the range of $(2r+1)(2r+1)$ or use $(2r+1)\times(2r+1)$ pixels selected over a wider range than the range of $(2r+1)\times(2r+1)$.

When the geometric filter 420 is additionally used for flow update in the flow estimation neural network 140, pixels to be used when calculating a correlation value may be selected, thereby reducing the waste of memory and increasing the accuracy of selecting flow candidates in the flow estimation neural network 140.

Figure 5:
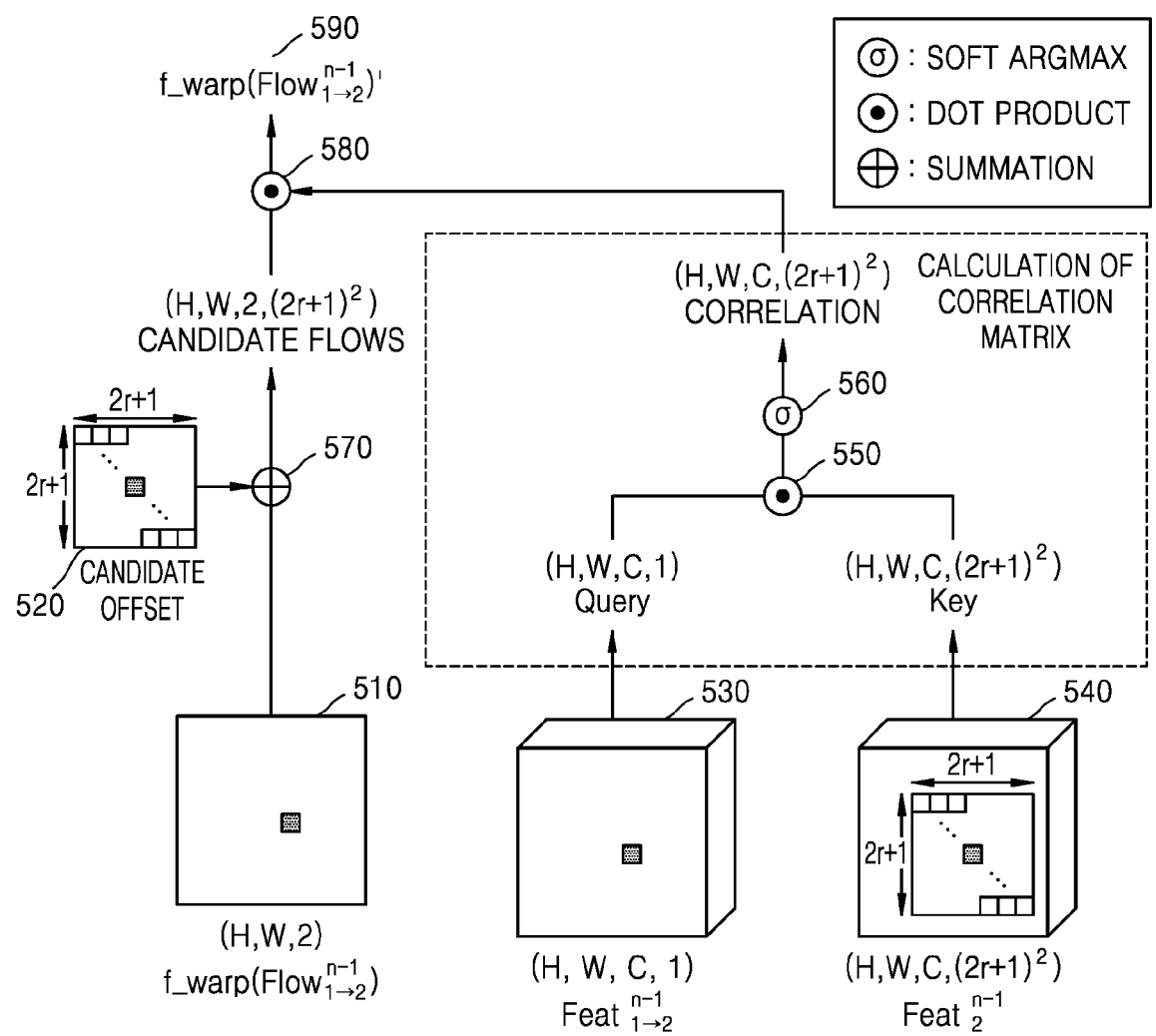
FIG. 5 is a diagram of an example of a method of updating an optical flow according to an embodiment.

FIG. 5 is a diagram of an example of a method of updating an optical flow according to an embodiment.

Referring to FIG. 5, an optical flow is updated from a current level to a next higher level by using feature maps at a plurality of levels having a pyramid structure.

In detail, an optical flow f_warp(Flow$^{n-1}_{1 \rightarrow 2}$) 510 obtained by updating an optical flow at a lower level and then upscaling it to correspond to a current level n-1 has coordinates of a pixel with a highest correlation value. Candidate flows are obtained by adding (e.g., with adding operation 570) a candidate offset 520 for pixels within a particular range based on the coordinates of the pixel having the highest correlation value to the optical flow f_warp (Flow$^{n-1}_{1 \rightarrow 2}$) 510.

A position of a pixel having a highest correlation value is obtained by inputting, to a soft argmax function 560, a result of calculating a dot product 550 between pixels in a forward-warped first feature map Feat$^{n-1}_{1 \rightarrow 2}$ 530 at the current level n-1 and pixels in a particular range of a second feature map Feat$^{n-1}_{2}$ 540 at the current level n-1. The forward-warped first feature map Feat$^{n-1}_{1 \rightarrow 2}$ 530 at the current level n-1 serves as a query, and the second feature map Feat$^{n-1}_{2}$ 540 at the current level n-1 serves as a key, so that a position of a pixel having a highest correlation value is obtained as a result.

An updated optical flow f_warp(Flow$^{n-1}_{1 \rightarrow 2}$)' 590 at the current level n-1 may be obtained by calculating a dot product 580 between flow candidates based on the optical flow f_warp(Flow$^{n-1}_{1 \rightarrow 2}$) 510, which is obtained by updating an optical flow at a lower level and then upscaling it to correspond to the current level n-1, and a position of coordinates having a highest correlation value as a result of calculating correlation values. By upscaling the updated optical flow f_warp(Flow$^{n-1}_{1 \rightarrow 2}$)' 590 at the current level n-1 to correspond to a next higher level n, the optical flow at the next higher level n may be obtained.

By repeating these operations for each level, e.g., by updating optical flows at levels lower than a highest level and then upscaling the updated optical flows to the highest level, final optical flows at the highest level corresponding to first and second frames may be obtained.

By calculating correlation values through comparison within a limited range, an optimal optical flow may be estimated while reducing spatial complexity.

H, W, and 2 of the optical flow f_warp(Flow$^{n-1}_{1 \rightarrow 2}$) 510 obtained by updating an optical flow at a lower level and then upscaling it to correspond to the current level n-1 respectively denote a height, a width, and information representing x and y coordinates of a pixel in the optical flow f_warp(Flow$^{n-1}_{1 \rightarrow 2}$) 510. H, W, and C of the forward-warped first feature map Feat$^{n-1}_{1 \rightarrow 2}$ 530 at the current level n-1 respectively denote a height, a width, and a channel of the forward-warped first feature map Feat$^{n-1}_{1 \rightarrow 2}$ 530, and 1 denotes a pixel to currently be updated. In addition, H, W, and C of second feature map Feat$^{n-1}_{2}$ 540 at the current level n-1 respectively denote a height, a width, and a channel thereof, and $(2r+1)^2$ denotes a range of pixels to be used in correlation value calculation.

Figure 6:
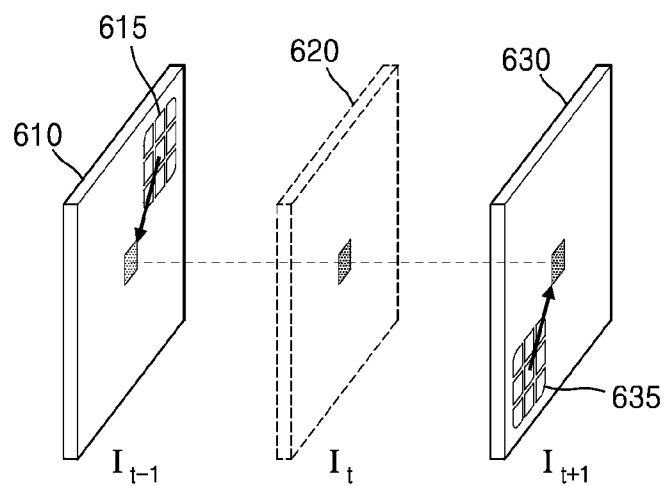
FIG. 6 is a diagram of an example of a process of interpolating an image frame via an AI-based frame interpolation filter according to an embodiment.

FIG. 6 is a diagram of an example of a process of interpolating an image frame via an AI-based frame interpolation filter according to an embodiment.

Referring to FIG. 6, a first frame interpolation filter 615 for each pixel in a first frame 610 and a second frame interpolation filter 635 for each pixel in a second frame 630 are obtained via an interpolation filter neural network. The first interpolation filter 615 has a different filter coefficient for each pixel in the first frame 610, and the second interpolation filter 635 has a different filter coefficient for each pixel in the second frame 630. Accordingly, by respectively applying the first and second frame interpolation filters 615 and 635 to the first and second frames 610 and 630, a third frame 620 is interpolated between the first and second frames 610 and 630.

Because warping of a frame inevitably results in deterioration of image quality, when blending is performed using an image warped via an optical flow, an afterimage appears in the resulting image or image quality is degraded. To solve this problem, the first frame interpolation filter 615 having a different filter coefficient for each pixel in the first frame 610 and the second frame interpolation filter 635 for each pixel in a second frame 630 are obtained via a trained interpolation filter neural network, and the third frame 620 is interpolated using the first and second frame interpolation filters 615 and 635. By estimating and using a different transform kernel for each pixel, a warping mismatch between frames is corrected so that flows and brightness are corrected, and accordingly, the accuracy of an interpolated frame is improved. Therefore, such frame interpolation may be beneficial in improving performance and accuracy of reconstruction of a high-quality image such as a 4K image.

Figure 7:
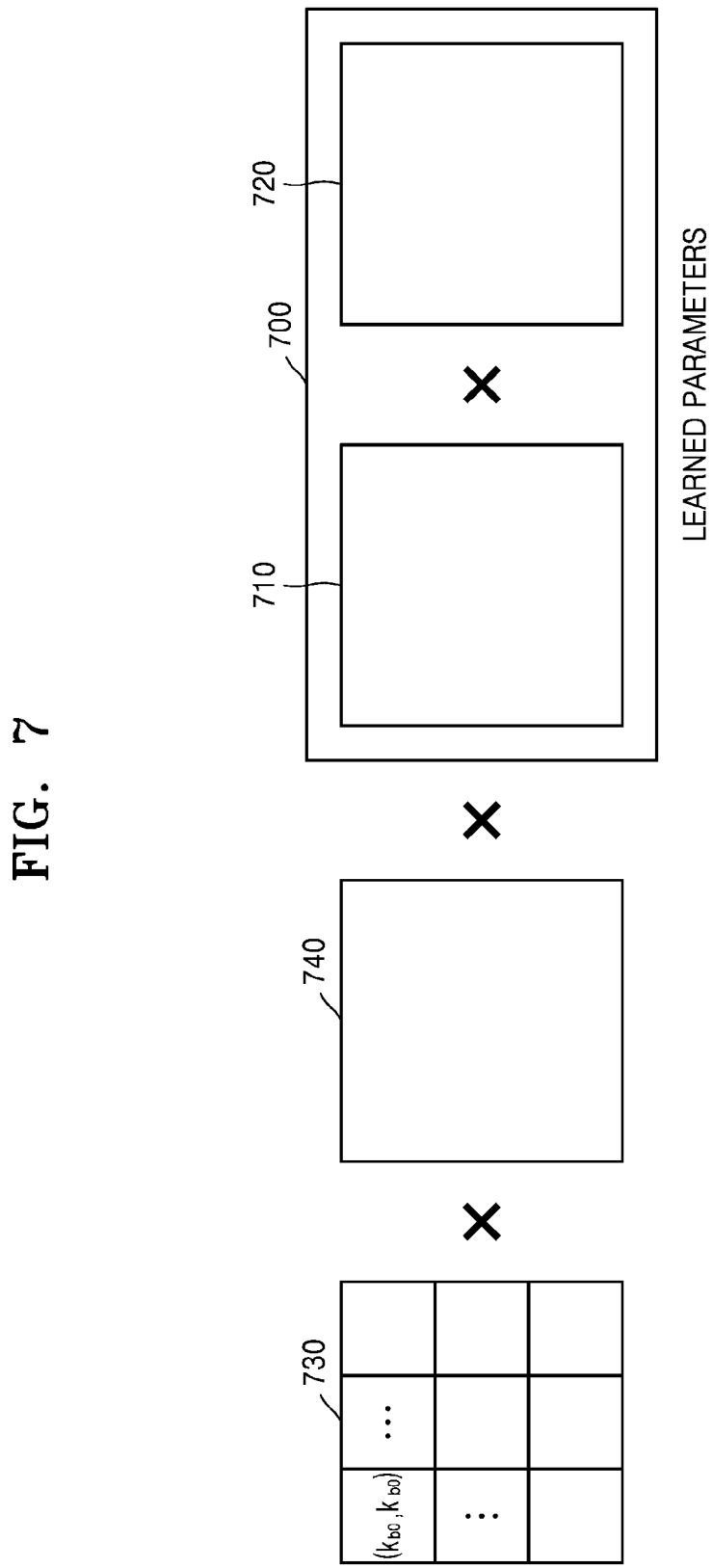
FIG. 7 is a diagram of an example of an AI-based frame interpolation filter according to an embodiment.

FIG. 7 is a diagram of an example of an AI-based frame interpolation filter according to an embodiment.

Referring to FIG. 7, the AI-based frame interpolation filter obtained via an interpolation filter neural network includes a filter kernel 700 consisting of a transform kernel 710 for warping and a transform kernel 720 for occlusion, which are derived using learned parameters of the interpolation filter neural network.

In addition, the AI-based frame interpolation filter may further include a bilinear interpolation kernel 730 and an attention kernel 740.

The bilinear interpolation kernel 730 is a transform kernel for sub-pixel calculation, and the attention kernel 740 is a kernel calculated based on previously known information such as time t for a third frame, depth map information when first and second frames each include depth information, geometric information of the first and second frames, etc. The attention kernel 740 may be derived via a trained neural network.

The bilinear interpolation kernel 730 may be determined by an estimated flow, and the attention kernel 740 may use a weight for each kernel location, for example, a Gaussian weight.

The bilinear interpolation kernel 730 and the attention kernel 740 are used for improving a result by using previously known information as well as parameters learned by the interpolation filter neural network in order to facilitate estimation of consistency between two input frames.

In addition, the transform kernel 710 for warping and the transform kernel 720 for occlusion are respectively learned and output by neural networks for the transform kernel 710 for warping and the transform kernel 720 for occlusion rather than by a single interpolation filter neural network.

The neural network for the transform kernel 710 for warping is trained mainly using input data for an optical flow, and the neural network for the transform kernel 720 for occlusion may be trained mainly using importance weights.

Figure 8:
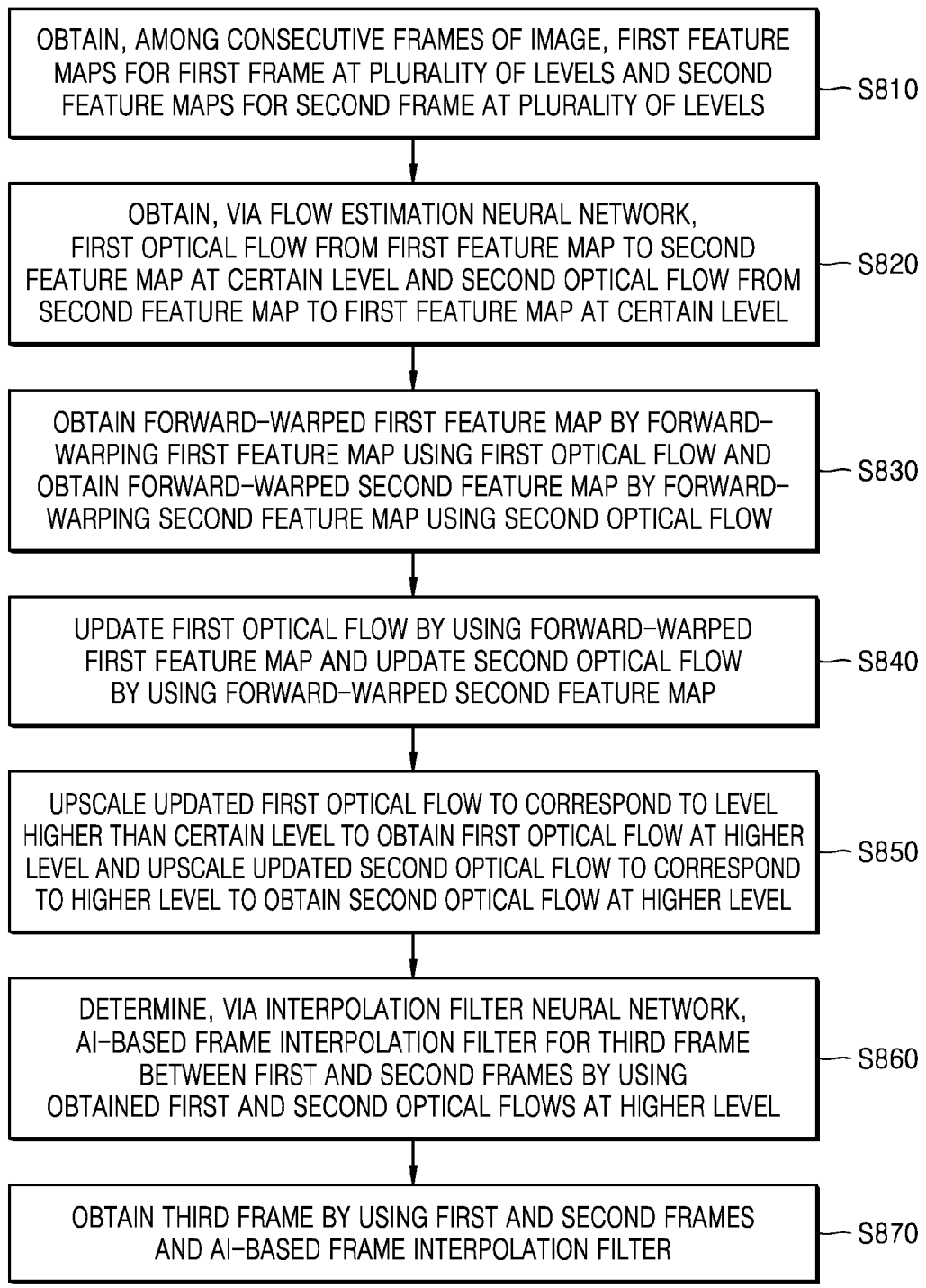
FIG. 8 is a flowchart of an AI-based frame interpolation method according to an embodiment.

FIG. 8 is a flowchart of an AI-based frame interpolation method according to an embodiment.

In operation S810, an AI-based frame interpolation apparatus (900 of FIG. 9) obtains, from among consecutive frames of an image, first feature maps for a first frame at a plurality of levels and second feature maps for a second frame at a plurality of levels.

According to an embodiment of the disclosure, a first feature map of the first frame, corresponding to a highest level, and a second feature map of the second frame, corresponding to the highest level, may be obtained via a first neural network, and first and second feature maps at levels lower than the highest level may be obtained via a downsampling neural network, where the first and second feature maps at the plurality of levels may be respectively the first and second feature maps at the levels lower than the highest level.

In operation S820, the AI-based frame interpolation apparatus 900 obtains, via a flow estimation neural network, a first optical flow from a first feature map at a certain level to a second feature map at the certain level and a second optical flow from the second feature map at the certain level to the first feature map at the certain level.

In operation S830, the AI-based frame interpolation apparatus 900 obtains a forward-warped first feature map by forward-warping the first feature map based on the first optical flow and a forward-warped second feature map by forward-warping the second feature map based on the second optical flow.

In operation S840, the AI-based frame interpolation apparatus 900 updates the first optical flow by using the forward-warped first feature map and the second optical flow by using the forward-warped second feature map.

In operation S850, the AI-based frame interpolation apparatus 900 upscales the updated first optical flow to correspond to a level higher than the certain level to obtain a first optical flow at the higher level and upscales the updated second optical flow to correspond to the higher level to obtain a second optical flow at the higher level.

According to an embodiment of the disclosure, the higher level may be the highest level, and the highest level may be a level corresponding to the first and second frames.

According to another embodiment of the disclosure, when the certain level is the highest level, the first and second optical flows at the highest level may not be upscaled after being updated. In detail, a forward-warped first feature map may be obtained by forward-warping the first feature map at the highest level using a first optical flow at the highest level, a forward-warped second feature map may be obtained by forward-warping the second feature map at the highest level using a second optical flow at the highest level, the first optical flow at the highest level may be updated using the forward-warped first feature map, the second optical flow at the highest level may be updated using the forward-warped second feature map, and the first and second optical flows at the highest level may not be upscaled for use.

According to an embodiment of the disclosure, the obtaining of the first and second optical flows at the higher level via the flow estimation neural network may include: obtaining a first importance weight at the certain level, where the first importance weight indicates how many pixels in the first feature map at the certain level are mapped to a pixel in the second feature map at the certain level; and obtaining a second importance weight at the certain level, where the second importance weight indicates how many pixels in the second feature map at the certain level are mapped to a pixel in the first feature map at the certain level.

According to an embodiment of the disclosure, the forward-warped first feature map may be obtained by further using the first importance weight at the certain level, and the forward-warped second feature map may be obtained by further using the second importance weight at the certain level.

According to an embodiment of the disclosure, a first importance weight at the higher level may be obtained based on the first optical flow at the higher level, and a second importance weight at the higher level may be obtained based on the second optical flow at the higher level.

According to an embodiment of the disclosure, determining, via an interpolation filter neural network, an AI-based frame interpolation filter for a third frame between the first and second frames by using the obtained first and second optical flows at the higher level may include obtaining, based on the first and second optical flows at the higher level and the first and second importance weights at the higher level, a first intermediate optical flow from the third frame to the first frame and a second intermediate optical flow from the third frame to the second frame via an intermediate flow estimation neural network; obtaining, based on the first and second intermediate optical flows, forward-warped first and second frames for time t of the third frame and backward-warped first and second frames for time t, and determining, based on the forward-warped first and second frames and the backward-warped first and second frames, the AI-based frame interpolation filter for the third frame via the interpolation filter neural network.

According to an embodiment of the disclosure, the determining of, via the interpolation filter neural network, the AI-based frame interpolation filter for the third frame between the first and second frames by using the obtained first and second optical flows at the higher level may further include obtaining, based on the first and second optical flows at the higher level and the first and second importance weights at the higher level, a first intermediate optical flow from the third frame to the first frame and a second intermediate optical flow from the third frame to the second frame via an intermediate flow estimation neural network, obtaining, based on the first and second intermediate optical flows, forward-warped first and second frames for time t for the third frame, and determining, based on the forward-warped first and second frames, the AI-based frame interpolation filter for the third frame via the interpolation filter neural network.

According to an embodiment of the disclosure, the determining of, via the interpolation filter neural network, the AI-based frame interpolation filter for the third frame between the first and second frames by using the obtained first and second optical flows at the higher level may further include obtaining, based on the first and second optical flows at the higher level and the first and second importance weights at the higher level, a first intermediate optical flow from the third frame to the first frame and a second intermediate optical flow from the third frame to the second frame via an intermediate flow estimation neural network, obtaining, based on the first and second intermediate optical flows, backward-warped first and second frames for time t of the third frame, and determining, based on the backward-warped first and second frames, the AI-based frame interpolation filter for the third frame via the interpolation filter neural network.

According to an embodiment of the disclosure, the first optical flow at the certain level may be updated based on a first correlation value between the forward-warped first feature map and the second feature map at the certain level, and the second optical flow at the certain level may be updated based on a second correlation value between the forward-warped second feature map and the first feature map at the certain level.

According to an embodiment of the disclosure, the first optical flow at the certain level may be updated based on the first correlation value with candidate pixels within a predetermined range of the forward-warped first feature map at the certain level, while the second optical flow at the certain level may be updated based on the second correlation value with candidate pixels within a predetermined range of the forward-warped second feature map at the certain level.

According to an embodiment of the disclosure, the predetermined range may vary according to a size of a feature map at the certain level. In detail, the predetermined range is a range corresponding to a radius r from a pixel to be used in calculating a correlation value for a feature map, and when coordinates of the pixel are (x, y), the range may be x−r≤x≤x+r and y−r≤y≤y+r. Here, a length of the radius r may vary according to a size of a feature map at the certain level.

According to an embodiment of the disclosure, pixels used to calculate the first correlation value may be determined by a filter set by a user, and pixels used to calculate the second correlation value may be determined by a filter set by the user.

According to an embodiment of the disclosure, pixels used to calculate the first correlation value may be determined based on a trained neural network, and pixels used to calculate the second correlation value may be determined based on a trained neural network.

According to an embodiment of the disclosure, a highest correlation value among correlation values with the pixels within the predetermined range of the second feature map at the certain level may be determined as the first correlation value, and a highest correlation value among correlation values with the pixels within the predetermined range of the first feature map at the certain level may be determined as the second correlation value.

According to an embodiment of the disclosure, the first and second optical flows initially obtained at a lowest level among the plurality of levels may be each set to 0.

In operation S860, the AI-based frame interpolation apparatus 900 determines, via the interpolation filter neural network, an AI-based frame interpolation filter for a third frame between the first and second frames by using the obtained first and second optical flows at the higher level.

According to an embodiment of the disclosure, the AI-based frame interpolation filter may include a filter kernel corresponding to each of the pixels in the first and second frames.

According to an embodiment of the disclosure, in order to determine the AI-based frame interpolation filter, contextual feature maps of the first and second frames may be additionally input to the interpolation filter neural network, and the contextual feature maps may be determined as a sum of an output value of a second neural network which receives the first and second frames as an input and an output value of a predetermined classification network which receives the first and second frames as an input. The predetermined classification network may be either VGG-16 or ResNet which is one of the VGGNet structures developed by a Visual Geometry Group (VGG) research team at Oxford University. Furthermore, the output value of the predetermined classification network may be one among an output value at a last layer of the classification network, an output value at an intermediate layer of the classification network, an output value at some layers of the classification network, some of output values at the intermediate or last layer of the classification network.

According to an embodiment of the disclosure, the AI-based frame interpolation filter may further include a filter kernel for bilinear interpolation used for calculation of sub-pixels.

According to an embodiment of the disclosure, the AI-based frame interpolation filter may further include a filter kernel based on at least one of a Z-map or a time of the third frame.

According to an embodiment of the disclosure, when depth information of the first frame and depth information of the second frame exist, the depth information of the first frame and the depth information of the second frame may be additionally input to the interpolation filter neural network.

In operation S870, the AI-based frame interpolation apparatus 900 obtains the third frame by using the first and second frames and the AI-based frame interpolation filter.

According to an embodiment of the disclosure, the AI-based frame interpolation filter may include first and second frame interpolation filters respectively applied to the first and second frames.

Figure 9:
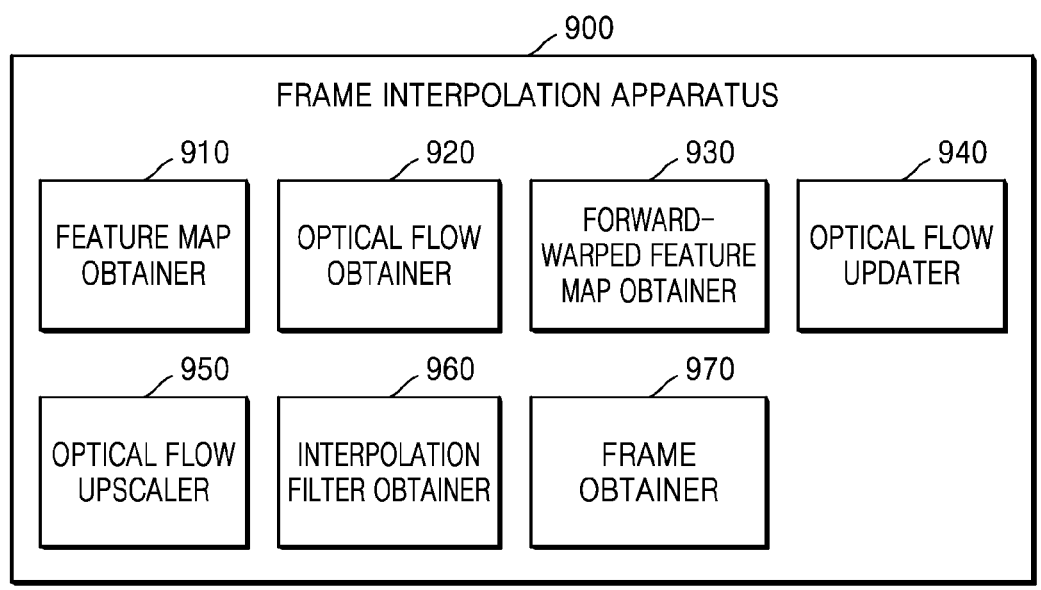
FIG. 9 is a diagram of a configuration of an AI-based frame interpolation apparatus according to an embodiment.

FIG. 9 is a diagram of a configuration of an AI-based frame interpolation apparatus according to an embodiment.

Referring to FIG. 9, the AI-based frame interpolation apparatus 900 includes a feature map obtainer 910, an optical flow obtainer 920, a forward-warped feature map obtainer 930, an optical flow updater 940, an optical flow upscaler 950, an interpolation filter obtainer 960, and a frame obtainer 970.

The feature map obtainer 910, the forward-warped feature map obtainer 930, the optical flow updater 940, the optical flow upscaler 950, the interpolation filter obtainer 960, and the frame obtainer 970 may be implemented as a processor, and operate according to instructions stored in a memory.

Although FIG. 9 shows the feature map obtainer 910, the forward-warped feature map obtainer 930, the optical flow updater 940, the optical flow upscaler 950, the interpolation filter obtainer 960, and the frame obtainer 970 as individual components, the feature map obtainer 910, the forward-warped feature map obtainer 930, the optical flow updater 940, the optical flow upscaler 950, the interpolation filter obtainer 960, and the frame obtainer 970 may be implemented through a single processor. In this case, the feature map obtainer 910, the forward-warped feature map obtainer 930, the optical flow updater 940, the optical flow upscaler 950, the interpolation filter obtainer 960, and the frame obtainer 970 may be implemented as a dedicated processor or through a combination of software and a general-purpose processor such as an application processor (AP), a central processing unit (CPU), or a graphics processing unit (GPU). Furthermore, when they are implemented as the dedicated processor, the dedicated processor may include a memory for implementing an embodiment of the disclosure or a memory processing unit for using an external memory.

The feature map obtainer 910, the forward-warped feature map obtainer 930, the optical flow updater 940, the optical flow upscaler 950, the interpolation filter obtainer 960, and the frame obtainer 970 may be configured as a plurality of processors. In this case, they may be implemented via a combination of dedicated processors or a combination of software and multiple general-purpose processors such as an AP, a CPU, or a GPU.

The feature map obtainer 910 obtains, from among consecutive frames of an image, first feature maps for a first frame at a plurality of levels and second feature maps for a second frame at a plurality of levels.

The optical flow obtainer 920 obtains, via a flow estimation neural network, a first optical flow from a first feature map to a second feature map at a certain level and a second optical flow from the second feature map to the first feature map at the certain level.

The forward-warped feature map obtainer 930 obtains a forward-warped first feature map by forward-warping the first feature map based on the first optical flow and a forward-warped second feature map by forward-warping the second feature map based on the second optical flow.

The optical flow updater 940 updates the first and second optical flows by respectively using the forward-warped first and second feature maps.

The optical flow upscaler 950 upscales the updated first and second optical flows to correspond to a level higher than the certain level to respectively obtain first and second optical flows at the higher level.

The interpolation filter obtainer 960 determines, via an interpolation filter neural network, an AI-based frame interpolation filter for a third frame between the first and second frames by using the obtained first and second optical flows at the higher level.

The frame obtainer 970 obtains the third frame by using the first and second frames and the AI-based frame interpolation filter.

The above-described embodiments of the disclosure may be written as computer-executable programs or instructions that may be stored in a machine-readable storage medium.

The machine-readable storage medium may be provided in the form of a non-transitory storage medium. In this regard, the term 'non-transitory' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, methods according to various embodiments of the disclosure set forth herein may be included in a computer program product when provided. The computer program product may be traded, as a product, between a seller and a buyer. For example, the computer program product may be distributed in the form of a machine-readable storage medium (e.g., compact disc read only memory (CD-ROM)) or distributed (e.g., downloaded or uploaded) on-line via an application store or directly between two user devices (e.g., smartphones). For online distribution, at least a part of the computer program product (e.g., a downloadable app) may be at least transiently stored or temporally created on a machine-readable storage medium such as a server of a manufacturer, a server of an application store, or a memory of a relay server.

Although the disclosure has been described with reference to various embodiments as an example, it should be understood that the various embodiments are intended to be exemplary and are not limiting the disclosure. It will be apparent to those skilled in the art that various changes can be made in form and detail without departing from the overall scope of the disclosure, including the appended claims and equivalents to the same.

The invention claimed is:

1. An artificial intelligence (AI)-based frame interpolation method comprising:
    obtaining, from among consecutive frames of an image, feature maps for a first frame at a plurality of levels and feature maps for a second frame at the plurality of levels;
    obtaining, via a flow estimation neural network, a first optical flow from a first feature map at a certain level to a second feature map at the certain level and a second optical flow from the second feature map at the certain level to the first feature map at the certain level;
    obtaining a forward-warped first feature map by forward-warping the first feature map using the first optical flow and a forward-warped second feature map by forward-warping the second feature map using the second optical flow;
    updating the first optical flow by using the forward-warped first feature map;
    updating the second optical flow by using the forward-warped second feature map;
    obtaining a first optical flow at a higher level that is higher than the certain level by upscaling the updated first optical flow to correspond to the higher level;
    obtaining a second optical flow at the higher level by upscaling the updated second optical flow to correspond to the higher level;
    determining, via an interpolation filter neural network, an AI-based frame interpolation filter for a third frame between the first frame and the second frame by using the obtained first optical flow at the higher level and the obtained second optical flow at the higher level; and
    obtaining the third frame by using the first frame, the second frame and the AI-based frame interpolation filter.

2. The AI-based frame interpolation method of claim 1, wherein the higher level is a highest level of the plurality of levels, and
    wherein the highest level is a level corresponding to the first frame and the second frame.

3. The AI-based frame interpolation method of claim 1, wherein a first feature map of the first frame corresponding to a highest level of the plurality of levels, and a second feature map of the second frame corresponding to the highest level, are obtained via a first neural network,
    wherein first feature maps and second feature maps at lower levels that are lower than the highest level are obtained via a downsampling neural network, and
    wherein the feature maps for the first frame at the plurality of levels and the feature maps for the second frame at the plurality of levels are respectively the first feature maps and the second feature maps at the lower levels.

4. The AI-based frame interpolation method of claim 1, wherein the obtaining of the first optical flow and the second optical flow at the higher level comprises:
    obtaining a first importance weight at the certain level, wherein the first importance weight indicates a number of pixels in the first feature map at the certain level that are mapped to a pixel in the second feature map at the certain level; and
    obtaining a second importance weight at the certain level, wherein the second importance weight indicates a number of pixels in the second feature map at the certain level that are mapped to a pixel in the first feature map at the certain level.

5. The AI-based frame interpolation method of claim 4, wherein the forward-warped first feature map is obtained by further using the first importance weight at the certain level, and
wherein the forward-warped second feature map is obtained by further using the second importance weight at the certain level.

6. The AI-based frame interpolation method of claim 4, wherein a first importance weight at the higher level is obtained based on the first optical flow at the higher level, and
wherein a second importance weight at the higher level is obtained based on the second optical flow at the higher level.

7. The AI-based frame interpolation method of claim 4, wherein the determining the AI-based frame interpolation filter for the third frame comprises:
obtaining, based on the first optical flow at the higher level, the second optical flow at the higher level, the first importance weight at the higher level and the second importance weight at the higher level, a first intermediate optical flow from the third frame to the first frame and a second intermediate optical flow from the third frame to the second frame via an intermediate flow estimation neural network;
obtaining forward-warped first frames and forward-warped second frames based on time t of the third frame and backward-warped first frames and backward-warped second frames based on the time t by using the first intermediate optical flow and the second intermediate optical flows; and
determining, based on the forward-warped first frames, the forward-warped second frames, the backward-warped first frames and the backward-warped second frames, the AI-based frame interpolation filter for the third frame via the interpolation filter neural network.

8. The AI-based frame interpolation method of claim 1, wherein the first optical flow at the certain level is updated based on a first correlation value between the forward-warped first feature map and the second feature map at the certain level, and
wherein the second optical flow at the certain level is updated based on a second correlation value between the forward-warped second feature map and the first feature map at the certain level.

9. The AI-based frame interpolation method of claim 8, wherein the first optical flow at the certain level is updated based on candidate pixels within a predetermined range of the first optical flow at the certain level, and
wherein the second optical flow at the certain level is updated based on candidate pixels within a predetermined range of the second optical flow at the certain level.

10. The AI-based frame interpolation method of claim 9, wherein the predetermined range varies according to a size of a feature map at the certain level.

11. The AI-based frame interpolation method of claim 1, wherein the first optical flow and the second optical flow initially obtained at a lowest level among the plurality of levels are set to 0.

12. The AI-based frame interpolation method of claim 1, wherein the AI-based frame interpolation filter comprises a filter kernel corresponding to each pixel in the first frame and the second frame.

13. The AI-based frame interpolation method of claim 12, wherein contextual feature maps of the first frame and the second frame are input to the interpolation filter neural network to determine the AI-based frame interpolation filter, and
wherein the contextual feature maps are determined as a sum of an output value of a second neural network which receives the first frame and the second frame as an input value and an output value of a predetermined classification network which receives the first frame and the second frame as an input.

14. The AI-based frame interpolation method of claim 1, wherein the AI-based frame interpolation filter comprises a first frame interpolation filter and a second frame interpolation filter respectively applied to the first frame and the second frame.

15. An artificial intelligence (AI)-based frame interpolation apparatus comprising:
a memory; and
a processor configured to:
obtain, from among consecutive frames of an image, feature maps for a first frame at a plurality of levels and feature maps for a second frame at the plurality of levels;
obtain, via a flow estimation neural network, a first optical flow from a first feature map at a certain level to a second feature map at the certain level and a second optical flow from the second feature map at the certain level to the first feature map at the certain level;
obtain a forward-warped first feature map by forward-warping the first feature map using the first optical flow and a forward-warped second feature map by forward-warping the second feature map using the second optical flow;
update the first optical flow by using the forward-warped first feature map;
update the second optical flow by using the forward-warped second feature map;
obtain a first optical flow at a higher level that is higher than the certain level by upscaling the updated first optical flow to correspond to the higher level;
obtain a second optical flow at the higher level by upscaling the updated second optical flow to correspond to the higher level;
determine, via an interpolation filter neural network, an AI-based frame interpolation filter for a third frame between the first frame and the second frame by using the obtained first optical flow at the higher level and the second optical flow at the higher level; and
obtain the third frame by using the first frame, the second frame, and the AI-based frame interpolation filter.

* * * * *